United States Patent
Heikenen

(10) Patent No.: US 9,067,116 B1
(45) Date of Patent: Jun. 30, 2015

(54) GOLF SWING TRAINING DEVICE AND METHOD

(71) Applicant: Charles E. Heikenen, Edina, MN (US)

(72) Inventor: Charles E. Heikenen, Edina, MN (US)

( * ) Notice: Subject to any disclaimer, the term of this patent is extended or adjusted under 35 U.S.C. 154(b) by 0 days.

(21) Appl. No.: 14/174,703

(22) Filed: Feb. 6, 2014

Related U.S. Application Data

(60) Provisional application No. 61/849,988, filed on Feb. 7, 2013.

(51) Int. Cl.
*A63B 69/36* (2006.01)
*A63B 71/06* (2006.01)

(52) U.S. Cl.
CPC ............. *A63B 69/36* (2013.01); *A63B 71/0686* (2013.01); *A63B 2243/0029* (2013.01)

(58) Field of Classification Search
USPC .......... 473/219–226, 257, 266, 268, 278, 409
See application file for complete search history.

(56) References Cited

U.S. PATENT DOCUMENTS

| | | | |
|---|---|---|---|
| 5,067,717 A * | 11/1991 | Harlan et al. | 473/209 |
| 5,346,220 A | 9/1994 | Cooper et al. | |
| 5,926,780 A * | 7/1999 | Fox et al. | 702/142 |
| 6,179,723 B1 | 1/2001 | Evans | |
| 6,517,352 B2 | 2/2003 | Smith | |
| 6,561,920 B1 | 5/2003 | Hamilton | |
| 7,077,765 B2 | 7/2006 | Grossmeyer et al. | |
| 7,727,081 B1 * | 6/2010 | McConnell | 473/222 |
| 7,780,545 B2 * | 8/2010 | Smith et al. | 473/266 |
| 8,052,540 B2 * | 11/2011 | Loh | 473/222 |
| 2001/0017347 A1 * | 8/2001 | Blankenship | 250/221 |
| 2005/0202893 A1 * | 9/2005 | Otten et al. | 473/219 |
| 2006/0014589 A1 * | 1/2006 | Kim | 473/233 |
| 2009/0082122 A1 * | 3/2009 | Kellogg | 473/222 |

* cited by examiner

*Primary Examiner* — Nini Legesse
(74) *Attorney, Agent, or Firm* — Richard John Bartz

(57) ABSTRACT

A golf swing training apparatus and method for improving golf swing tempo and rhythm uses a lighted strip that sequentially illuminates the backswing and foreswing patterns of a desired golf swing tempo. A control unit operatively connected to the light strip is programmed to control and vary the speed and tempo of the lighting sequence of the strip as desired.

11 Claims, 6 Drawing Sheets

US 9,067,116 B1

GOLF SWING TRAINING DEVICE AND METHOD

CROSS REFERENCE TO RELATED APPLICATION

This application claims the priority benefit of U.S. Provisional Patent Application Ser. No. 61/849,988 filed Feb. 7, 2013.

FIELD OF THE INVENTION

The technology of the invention relates to golf training devices and methods to improve golf swing tempo and rhythm.

BACKGROUND OF THE INVENTION

It is known golf is all about rhythm and being in the moment. To become a better golfer establishing a reliable stroke tempo and repeating it on every swing is essential. If a stroke is faster one swing and slower on the next the golf ball will travel inconsistent paths and distances. Improving tempo provides the golfer with a better opportunity to make the best swing and strike a golf ball solidly. A common problem is the rhythm is appropriate one swing and fast on the next and with each attempt the golfer is off balance at the end of the golfer's motion and catches the golf ball on the heel, toe, high, low or off-center on the golf club face. Balance and rhythm are essential for hitting solid shots. Without balance and rhythm the golfer seldom catches the ball square. The golfer may be able to achieve good positions in the golfer's backswing with poor swing rhythm, but poor and inconsistent swing rhythm will make it difficult to time the golfer's swing to be where the golfer wants to be at impact. Further, it is important to hold the finish of a golf swing to show and keep balance.

Putting requires a consistent rate of acceleration with the putter. Without consistent acceleration the putter moves into a golf ball different each time, which is a huge factor that prevents one from getting the ball started on the correct line consistently. Often times one will strike with a decelerating stroke. Holding the finish of a putting stroke keeps balance.

Cooper et at in U.S. Pat. No. 5,346,220 disclose a golf club swing practice device that teaches inside-out swings. A horizontal base is placed on the ground adjacent a golf ball. The base has a guiding member that guides club movement during a swing.

Evans in U.S. Pat. No. 6,179,723 discloses a metronome timing and tempo golf swing aid having a user-settable metronome attached to the end of a shaft. The metronome makes sound or flashing light to provide proper tempo. Bristles at the end of the device brush a mat during a swing to coincide with the metronome sound or flash.

Hamilton in U.S. Pat. No. 6,561,920 discloses a putting guide that is located between a golfer and a golf ball. The guide has a vertical front surface that guides the heel of the putter head during a putting stroke.

Grossmeyer et at discloses a light-based golf swing trainer having a pad with light-reactive material. An indicator attached to a putter has a light source that strikes the light-reactive material creating a visual representation of light on the pad whereby the path of the putter head is visually illustrated.

SUMMARY OF THE INVENTION

The golf training device of the invention has a generally linear base member operatively connected to a control unit for controlling a series of light members that illuminate in succession to simulate the speed and tempo of a proper backswing and foreswing tempo for a golf swing or putt.

DESCRIPTION OF THE DRAWING

FIG. 6 is a perspective view of the golf swing training device of FIG. 1 showing a golfer during golf swing follow through.

DESCRIPTION OF THE INVENTION

In the following detailed descriptions of the golf swing training device, reference is made to the accompanying drawing that forms a part hereof, and in which are shown, by way of illustration, specific embodiments in which the invention may be practiced. It is to be understood that other embodiments may be utilized and structure changes may be made or other method steps and sequence thereof may be used without departing from the scope of the present invention. The golf swing training device is herein described as used in a golf environment. The golf swing training device can have uses other than golfing.

Figure 1:
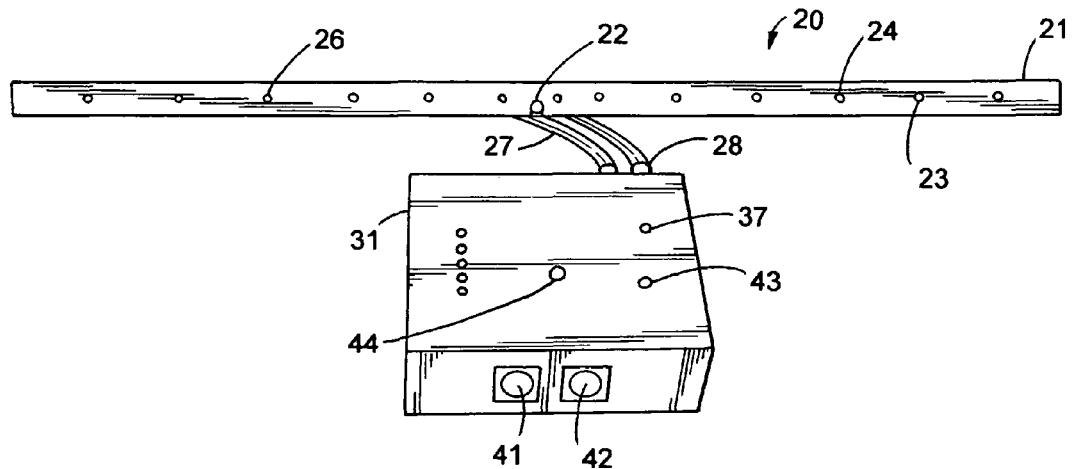
FIG. 1 is a front elevational view of the golf swing training device of the invention.
Figure 2:
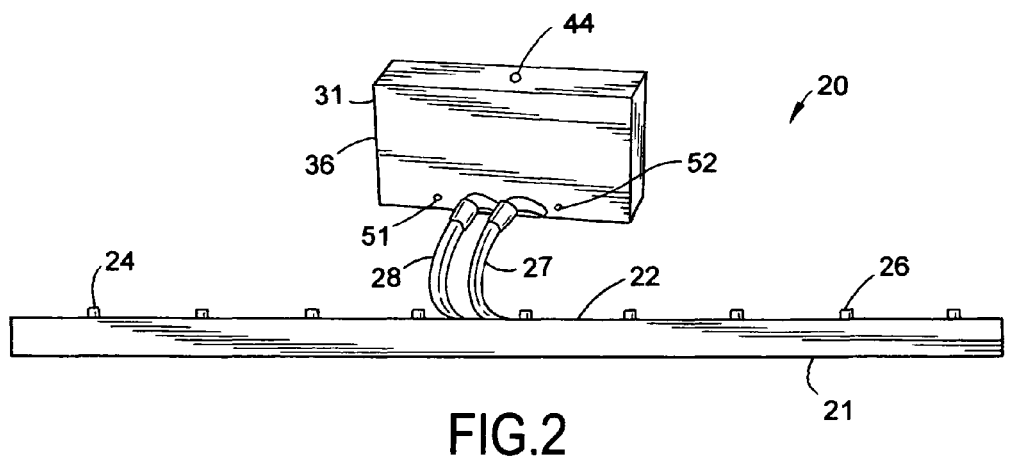
FIG. 2 is a rear elevational view of the golf swing training device of FIG. 1.

Referring to FIGS. 1 and 2, there is shown a golf swing training device indicated generally at 20 useable to train a golfer 10 to swing a golf club 11 with a desired tempo while causing golf club head 12 to strike a golf ball 13. Golf swing training device 20 is also useable as a warm-up aid for golfer 10 to establish a desired swing or putting tempo prior to a round of golf.

Golf swing training device 20 has an elongated generally linear channel shaped base member or strip 21 adapted to rest on a support surface, such as the ground, adjacent a golfer 10. Strip 21 has a top wall having a rearwardly inclined front wall 29 joined to a back wall 30. A centrally located indicator light 22 and a plurality of laterally spaced lights 23, 24 and 26 are mounted on front wall 29 of strip 21. Lights 22, 23, 24 and 26 are LED lights. Other types of lighting devices, such as light panels and the like, can be used for lights 22 to 26. Indicator light 22 is illuminated when training device 20 is in a ready mode prior to golf swing simulation. Upon activation of training device 20, lights 23, 24 and 26 illuminate generally linearly backwardly and then linearly forwardly in succession to simulate a desired golf club swing tempo. Illumination of lights 23, 24 and 26 is sequential starting at the middle of strip 21 and continuing generally linearly to the back end of strip 21 and then in the opposite direction generally linearly from the back end of strip 21 to the front end of strip 21. Lights 23 are a first series of light members equally spaced along the bottom of strip 21 extending in linear alignment from the middle of strip 21 to the back end of strip 21. Lights 23 illuminate one at a time in succession one after another from the middle of the strip to the back end of strip 21 representing and simulating the back swing of a golf club swing. Lights 24 are a second series of light members equally spaced and linearly aligned along the top of strip 21 and located above lights 23. Lights 24 illuminate one at a time in succession from the back end of strip 21 to the middle of strip 21 representing and simulating the down stroke of a golf club swing. The illumination of lights 24 accelerates during the down stroke or foreswing sequence of the golf swing. Lights 24 are illuminated following the illumination of lights 23. Lights 26 are a third series of light members equally spaced and linearly aligned with lights 24 extending from the middle of strip 21 to the front end of strip 21. Lights 26 are illuminated one at a time in succession from the middle of strip 21 to the front end of strip 21 representing and simulating the follow through of a golf club swing. Lights 26 are illuminated following the illumination of both lights 23 and 24. Lights 26 remain illuminated after lights 23 and 24 turn off to represent and simulate holding the finish of a golf swing. Lights 22, 23, 24 and 26 have different colors, such as white, yellow, red and green. Lights 22, 23, 24 and 26 can have other colors or can be all the same color. The sequential rate or speed of illumination of lights 23, 24 and 26 can be constant or the speed of illumination may vary. Illumination of lights 23, 24 and 26 can be patterned to follow a right-handed or a left-handed swing. The sequence and speed of illumination of lights 23, 24 and 26 can also be patterned after a desired swing, such as the personalized swing of golfer 10 or the swing of a preferred professional player.

A control unit 31 operatively connected to strip 21 with electrical wires 27 and 28 controls the operation of golf training swing device 20. Control unit 31 is a battery-powered device having a port 52 adapted to receive the plug of a battery charging electrical cord. Other electrical powering methods can be used to power control unit 31.

Control unit 31 is programmable to control sequences and duration of the illumination of lights 22, 23, 24 and 26. Control unit 31 has a generally rectangular housing 32 having a top wall 33, front wall 34 and rear wall 36. A light 37 mounted on the top wall 33 of control unit 31 is operable to indicate when control unit 31 is turned ON. A ON-OFF switch 51 for control unit 31 extends from rear wall 36. When switch 51 is moved to the ON position light 37 is illuminated. Front wall 34 of housing 32 has openings 38 and 39 accommodating outwardly facing electronic eyes 41 and 42. Eyes 41 and 42 sense the presence and movement of the head 12 of golf club 11 relative to control unit 31. Mode select switches 43 and 44 mounted on the top wall 33 of control unit 31 are used to manually change the settings of control unit 31 and vary the tempo of the light sequence. Lights 46, 47, 48, 49 and 50 extending along one end of top wall 33 function to indicate which swing pattern tempo the lighting sequence of lights 23, 24 and 26 will have, which can be patterned after a desired professional golfer's swing, the golfer's personal swing or otherwise.

Figure 3:
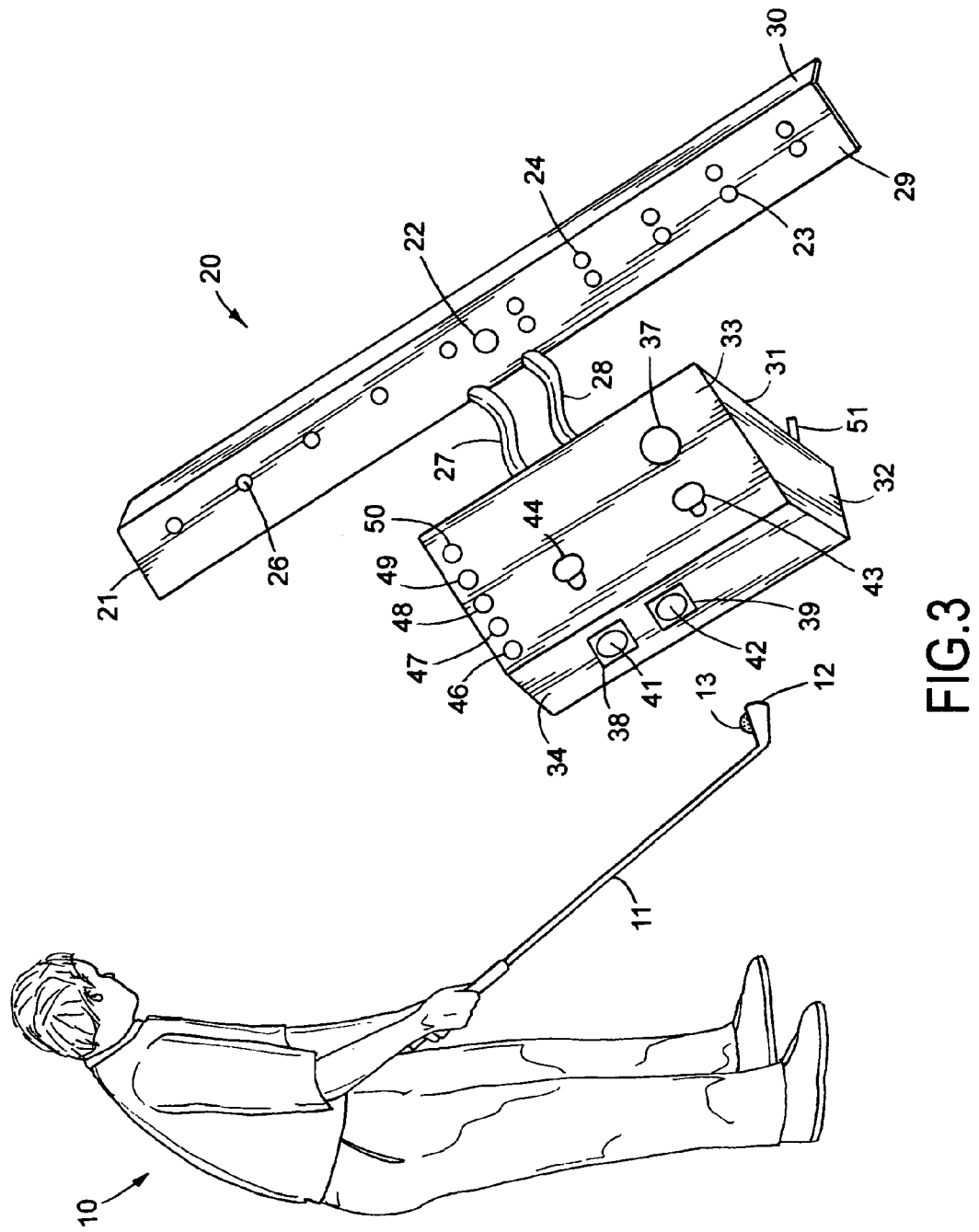
FIG. 3 is a perspective view of the golf swing training device of FIG. 1 showing a golfer addressing a golf ball placed adjacent the golf swing training device.
Figure 4:
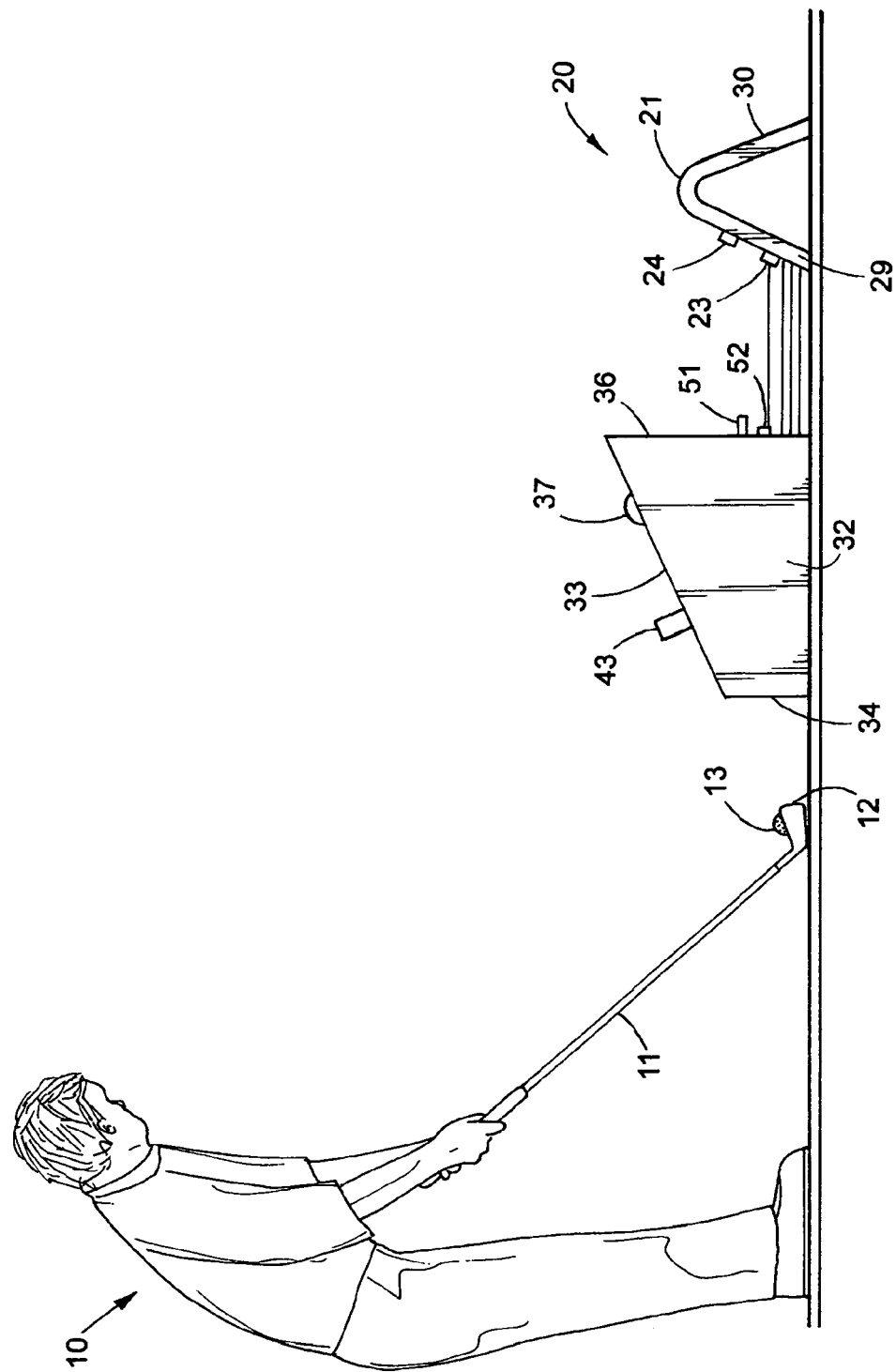
FIG. 4 is a side plan view of FIG. 3.
Figure 5:
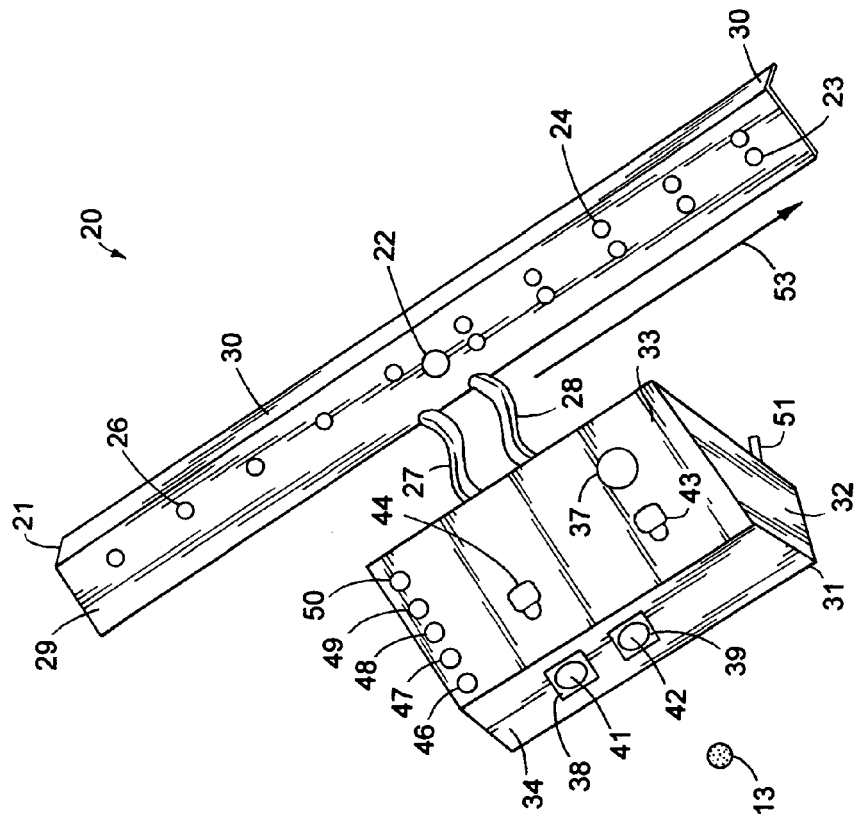
FIG. 5 is a perspective view of the golf swing training device of FIG. 1 showing a golfer during a back swing.
Figure 5:
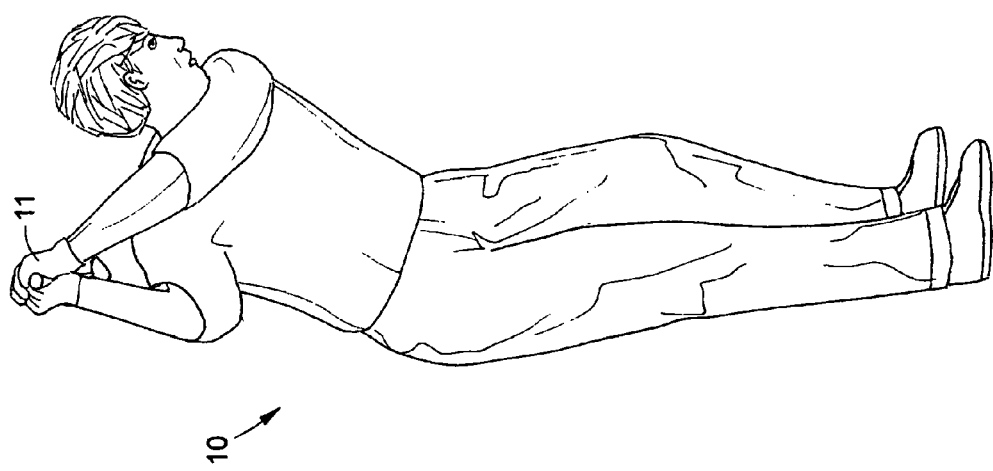
Figure 6:
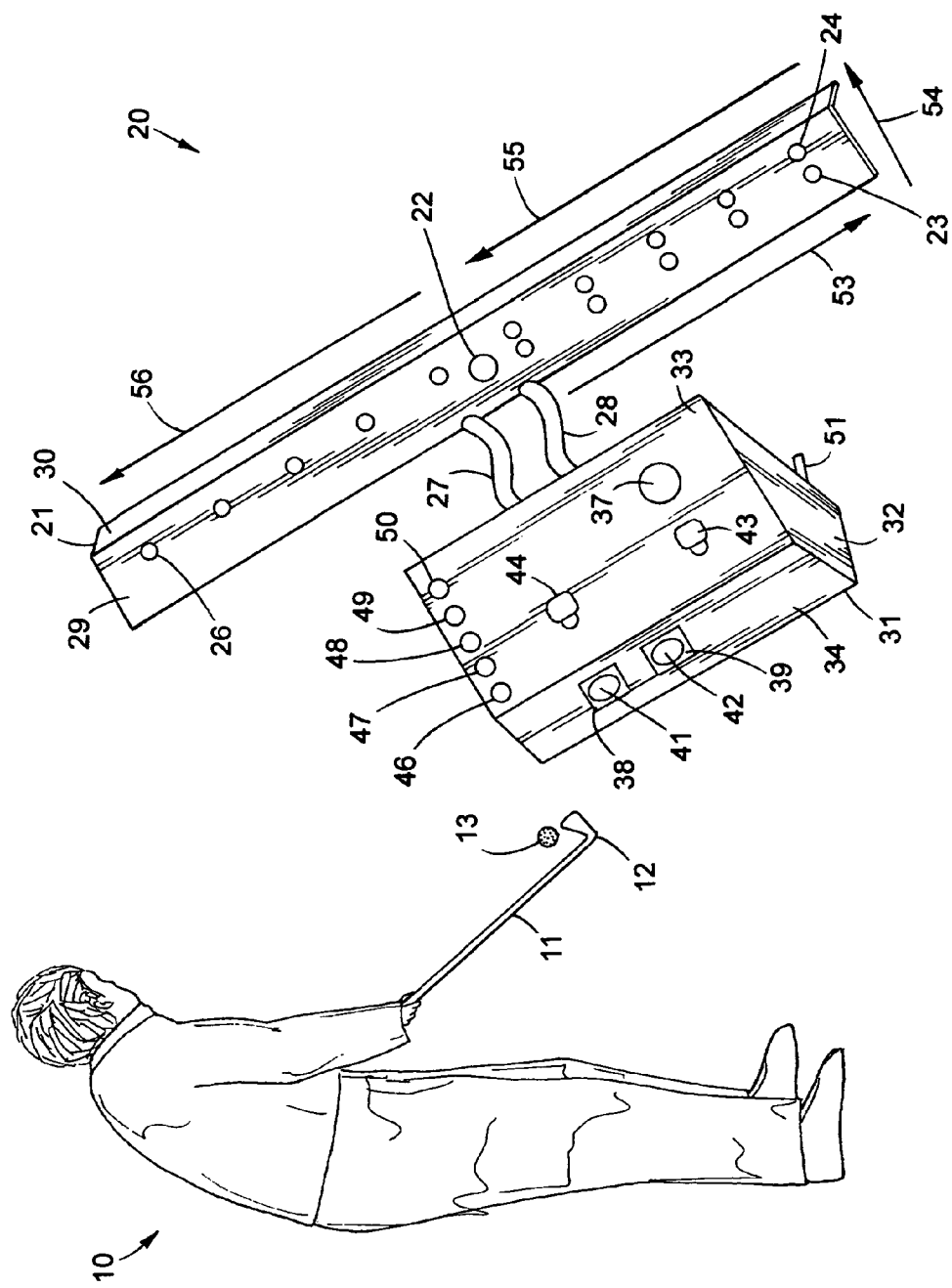

In use, ON-OFF switch 51 is actuated to turn control unit 31 ON whereby light 37 is illuminated. When golf club head 12 is located and sensed by electronic eyes 41 and 42 to be in the start position adjacent front wall 34 of control unit 31 as golfer 10 addresses golf ball 14 prior to commencement of a golf swing, as shown in FIGS. 3 and 4, control unit 31 activates training device 20 into a ready mode which is indicated by illumination of light 22. As golfer 10 begins his or her golf swing movement of golf club head 12 backwardly is sensed by eyes 41 and 42 whereby control unit 31 commences the lighting sequence of lights 23, 24 and 26. Golfer 10 continues the golf swing following or mimicking the simulated swing tempo pattern of the lighting sequence of lights 23, 24 and 26 rearwardly and then forwardly, as shown by arrow 53, 54, 55 and 56 in FIGS. 5 and 6. Lights 26 remain illuminated after lights 23 and 24 are deactivated to simulate holding the finish of the swing to show and keep balance.

Figure 7:
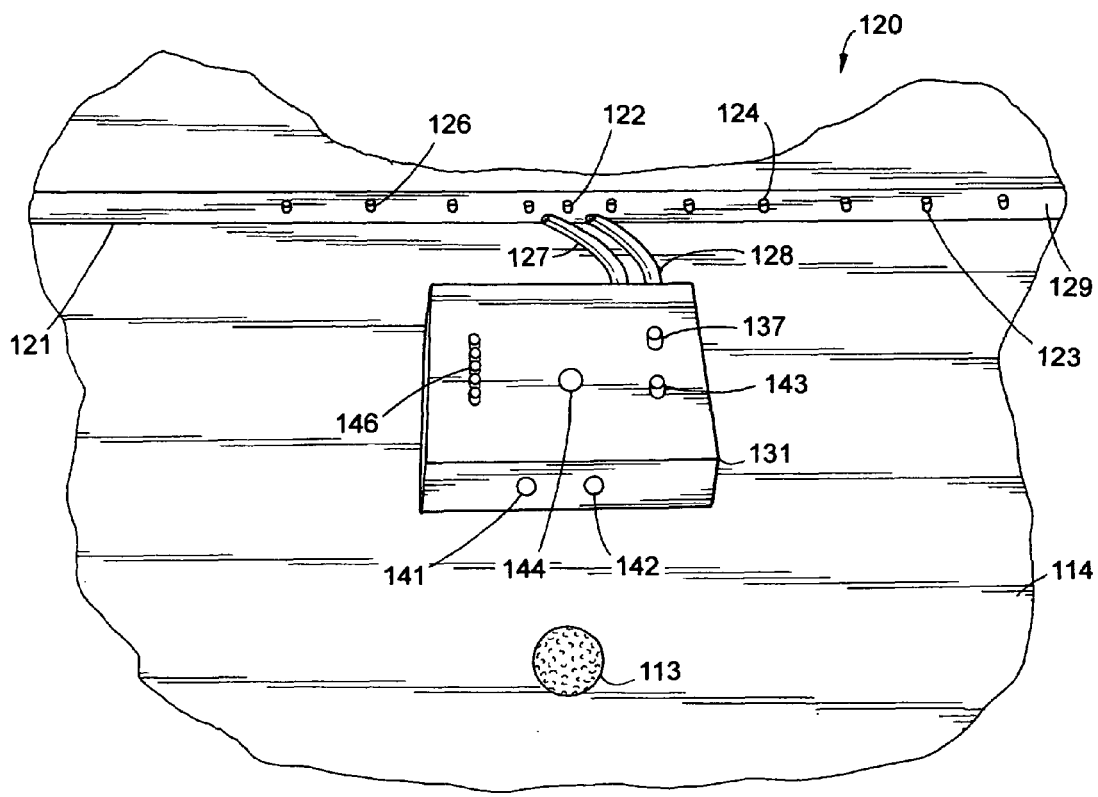
FIG. 7 is a modification of the golf swing training device of FIG. 1.

A first modification of the golf swing training device 120, shown in FIG. 7, has an elongated generally linear channel shaped base member or strip 121 and control unit 131 mounted on a mat 114, such as a mat for a golf driving range tee area. Lights 122, 123, 124 and 126 are mounted on the front wall 129 of strip member 121. Light 122 is used to indicate a ready mode of golf swing training device 120. Lights 123, 124 and 126 sequentially illuminate to pattern a desired backswing, downswing and follow through of a golf swing. Lights 126 remain illuminated to simulate holding the finish of the swing to keep balance. Golf ball 113 is positioned on mat 114 adjacent the front of control unit 131 prior to activation of golf swing training device 120. When golf swing training device 120 is activated lights 123, 124 and 126 sequentially illuminated to simulate a desired swing pattern. Control unit 131 is operatively connected to strip member 121 with electrical wires 127 and 128. Electronic eyes 141 and 142 located in the front of control unit 131 sense the presence and movement of the head of a golf club relative to control unit 131 to activate device 120 resulting in the sequential illumination of lights 123, 124 and 126 representing and simulating the back swing, down stroke and follow through of a golf swing. Switches 143 and 144 mounted on the top wall of control unit 131 are used to manually change the tempo of the light sequence of lights 123, 124 and 126, as desired. For example, the tempo of the light sequence can be patterned after the personalized swing of golfer 10 or the swing of a preferred professional player. Lights 146 indicate the swing mode setting of golf swing training device unit 120.

The invention claimed is:

1. A golf training apparatus for training a golfer to swing a golf club with a desired tempo comprising:
    a base member adapted to rest on a support surface adjacent a golfer,
    the base member having a top wall,
    a plurality of light members mounted on the top wall,
    the light members comprising
    a first series of lights extending from a middle portion of the base member to a back end of the base member,
    a second series of lights extending from a back end of the base member to a middle portion of the base member above the first series of lights, and
    a third series of lights extending from the middle portion of the base member to a front end of the base member,
    a control member located on the support surface adjacent the golfer operatively connected to the base member to control the illumination of the light members,
    at least one eye member supported by the control member operable to sense the presence and movement of a golf club and activate the control member whereby upon movement of the golf club the control member is activated,
    the control member operable to illuminate the first series of lights in sequence rearwardly from the middle portion of the base member to the back end of the base member, thereafter the second series of lights in sequence forwardly from the back end of the base member to the middle portion of the base member and thereafter the third series of lights in sequence forwardly from the middle portion of the base member to the front end of the base member, the speed of illumination of the second and third series of lights accelerating to simulate a desired golf club swing tempo of the golfer.

2. The golf training apparatus of claim 1 wherein:
the control member is operable to continue illumination of the third series of lights to simulate holding a desired golf club swing finish.

3. The golf training apparatus of claim 1 including:
an indicator light mounted on the top wall of the base member operable to indicate a ready mode.

4. The golf training apparatus of claim 1 wherein:
the eye member is operable to sense presence of the golf club in a start position prior to the illumination of the light members.

5. The golf training apparatus of claim 1 wherein:
the eye member is operable to sense movement of a golf club from a start position to commence the illumination of the light members.

6. The golf training apparatus of claim 1 wherein:
the base member and control member are attached to a golf driving range tee mat.

7. A method of training a golfer to swing a golf club with a desired tempo comprising:
positioning a base member having a plurality of light members adjacent a golfer,
positioning a control member having at least one eye member adjacent the golfer,
the eye member operable to sense the presence and movement of a golf club,
activating the light members into a ready mode when the eye member senses the presence of the golf club in a start position,
sequentially illuminating the light members to simulate a desired tempo of a golf swing when the eye member senses movement of the golf club from a start position,
continuing the illumination of one or more of the light members to simulate a desired finish and hold of the golf swing, and
illuminating the light members in sequence rearwardly from a middle portion of the base member to a back end of the base member and then forwardly from the back end of the base member to a front end of the base member to simulate a desired golf club swing tempo of a golfer.

8. The method of claim 7 including:
illuminating the light members in sequence with a constant rate of speed.

9. A method of training a golfer to swing a golf club with a desired tempo comprising:
positioning a base member having a plurality of light members adjacent a golfer,
positioning a control member having at least one eye member adjacent the golfer,
the eye member operable to sense the presence and movement of a golf club,
activating the light members into a ready mode when the eye member senses the presence of the golf club in a start position,
sequentially illuminating the light members to simulate a desired tempo of a golf swing when the eye member senses movement of the golf club from the start position,
continuing the illumination of one or more of the light members to simulate a desired finish and hold of the golf swing, and
accelerating the speed of illumination of a portion of the light members during a foreswing sequence of the golf swing.

10. The method of claim 9 including:
patterning the sequence and speed of illumination of the light members to simulate a desired golf swing.

11. The method of claim 9 including:
attaching the base member and control member to a mat for use in a golf driving range tee area.

* * * * *